July 15, 1941.                    W. A. DENNIS                    2,249,376
                                  SEED PLANTER
                              Filed May 27, 1940                 2 Sheets-Sheet 1
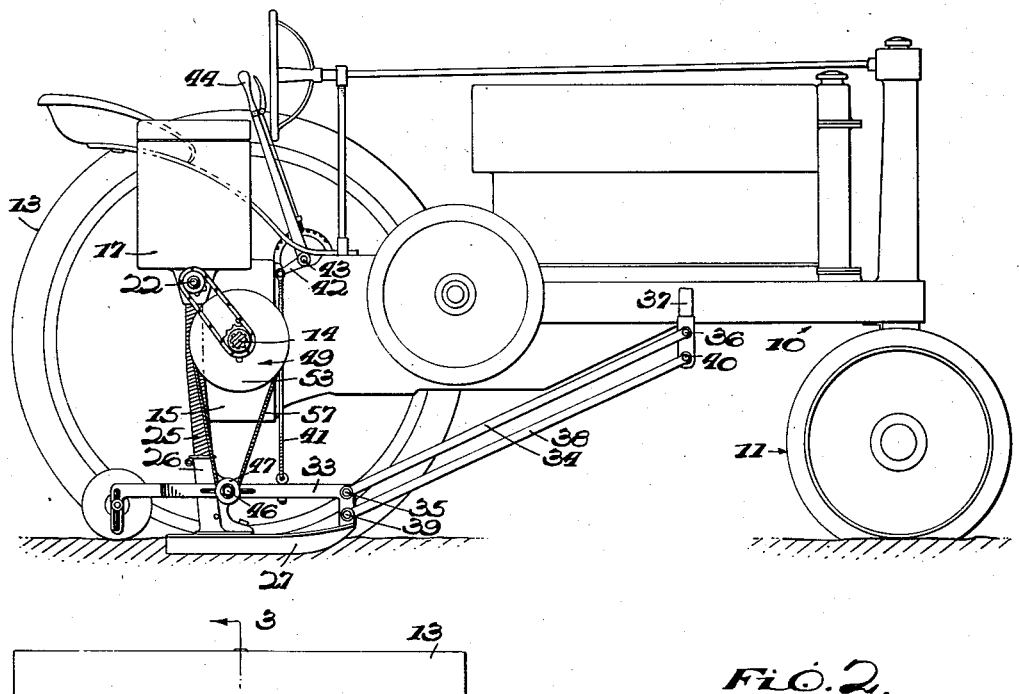
Inventor
William A. Dennis
By B. ... 
Attorney July 15, 1941.   W. A. DENNIS   2,249,376
SEED PLANTER
Filed May 27, 1940   2 Sheets-Sheet 2
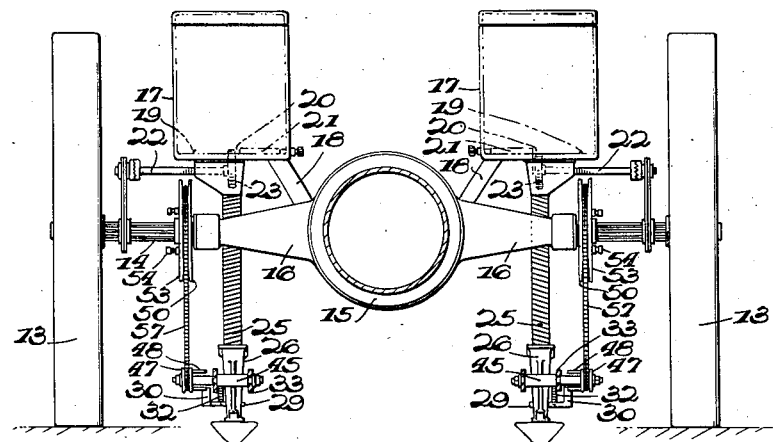
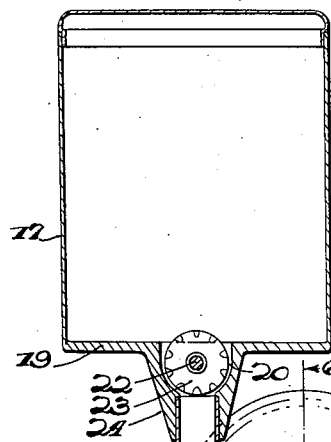
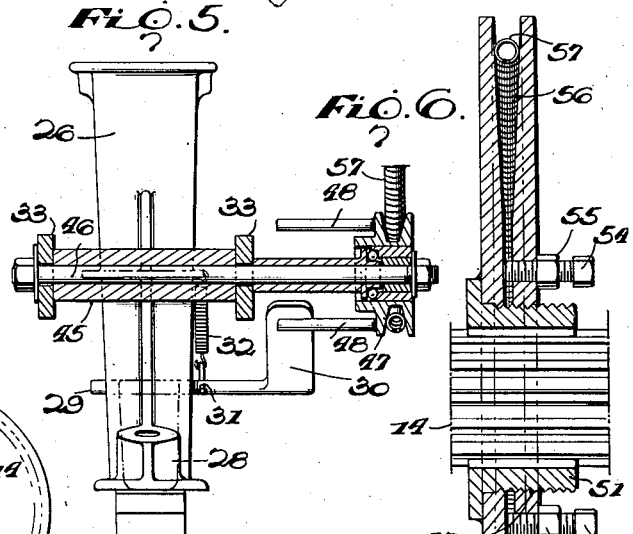
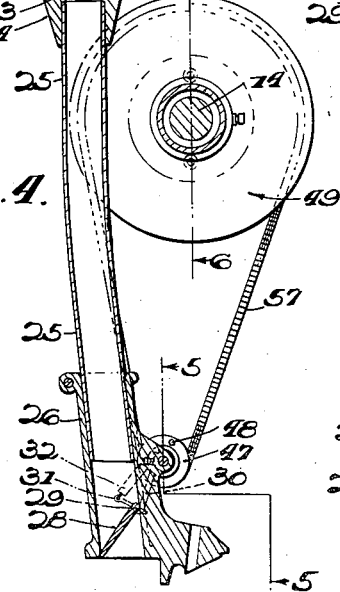
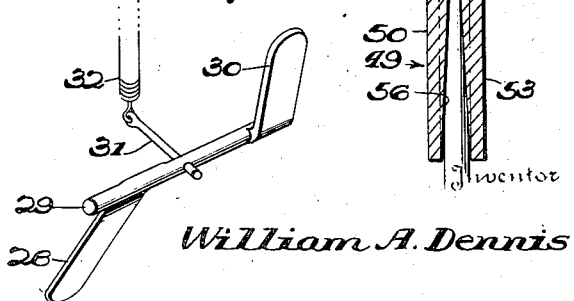
Inventor
William A. Dennis Patented July 15, 1941

2,249,376

UNITED STATES PATENT OFFICE 2,249,376

SEED PLANTER

William A. Dennis, Cameron, S. C.

Application May 27, 1940, Serial No. 337,539

9 Claims. (Cl. 111—34)

My invention relates to improvements in seed planters.

An important object of my invention is to provide a machine of the above mentioned character, adapted to plant various types of seed, and particularly well adapted to plant cotton seed.

A further object of the invention is to provide a planter of the above mentioned character which will plant the cotton seed or the like in well defined hills.

A further object of the invention is to provide means whereby the distance between the hills may be varied, between limits, as may be desired.

A further object of the invention is to provide a driving means for the seed feed valve, which will impart thereto a rapid intermittent movement.

A further object of the invention is to provide a drive which is automatically rendered inactive when the sword is raised.

A further object of the invention is to provide apparatus of the above mentioned character which is adapted to be applied to a tractor having splined axle sections.

Other objects and advantages of the invention will be apparent during the course of the following description.

In the accompanying drawings forming a part of this application and in which like numerals are employed to designate like parts throughout the same, Figure 1 is a side elevation of a planter embodying my invention, Figure 2 is a plan view of the same, Figure 3 is a front elevation of the feed hoppers and associated elements, viewed approximately from the line 3—3 of Figure 2, Figure 4 is a central vertical section through the seed hopper, associated elements being in elevation, Figure 5 is a vertical section upon an enlarged scale, taken on line 5—5 of Figure 4, Figure 6 is a similar view taken on line 6—6 of Figure 4, and, Figure 7 is a perspective view of the accumulator damper and associated elements.

In the drawings, wherein for the purpose of illustration is shown a preferred embodiment of my invention, the numeral 10 designates the chassis of a tractor, of any well known or preferred type, having the usual front steering wheels 11 and rear traction wheels 13. These traction wheels are adjustable laterally upon splined axle sections 14. The tractor further comprises a differential housing 15 carrying the usual axle housing sections 16. The foregoing is a general description of a conventional tractor.

My improved seed planting apparatus is in the nature of an attachment to be applied to this tractor, although the invention is not restricted to the use upon a tractor as it may be arranged upon any wheeled vehicle. I have illustrated two seed planting apparatus or units, arranged upon the opposite sides of the tractor seat. A detailed description of one unit will suffice for both. Each seed planting apparatus or unit comprises a vertical hopper 17, supported by any suitable means, such as a bracket 18 secured to the axle housing section 16. The hopper 17 is vertical and has a bottom 19 provided with a slot 20, through which the cotton seed or the like will pass. The slot 20 is covered or uncovered, in part, by an adjustable slide 21. Arranged near and beneath the bottom 19 is a rotary shaft 22, carrying a seed feed wheel 23, projecting upwardly into the slot 20. The shaft 22 is suitably driven from the engine of the tractor, as is well known. The seed discharged from the hopper 17 passes through a coupling 24, having a flexible hose 25 attached thereto. This flexible hose extends downwardly and is attached to the upper end of a boot 26. This boot is secured to the usual sword or furrow opener 27. The sword or furrow opener 27 is adjustable laterally, as is customary in the ordinary planter, and this adjustability is rendered possible by the flexible hose 25.

In order that the seed, particularly cotton seed, may be accurately planted in a hill, rather than spread over a relatively long area, the boot 26 is provided with an accumulator valve 28, arranged therein and rigidly mounted upon a horizontal transverse rock shaft 29. Particular attention is called to the fact that the accumulator valve 28 is vertically inclined in the line of movement of the machine and extends downwardly in a rearward direction. When the accumulator valve 28 is lowered, it moves from beneath the cotton seed or the like, and since the accumulator valve is in close proximity to the furrow, the seed will be accurately deposited in the hill.

The rock shaft 29 extends outwardly and is provided with a trip crank or finger 30. The rock shaft is provided with a second crank or finger 31 rigidly secured thereto, having connection with a retractile coil spring 32, attached to a fixed part of the boot 26. The spring 32 tends to hold the accumulator valve 28 seated or closed and to return the same to the seated position when released.

The boot 26 carrying the sword 27 is provided with a frame 33. An upper pair of guide links 34 are pivotally connected with the frame 33 at 35 and the forward end of these guide links 34 are pivotally connected, at 36, with a transverse bar 37, suitably secured to the chassis of the tractor. A lower pair of links 38 are pivotally connected at their rear ends with the frame 33, as shown at 39, and the forward ends of the links 38 are pivotally connected with the transverse bar 37, at 40. The boot 26 and associated elements move down by gravity and are raised by any suitable means, including a chain 41, attached to a crank 42 carried by a horizontal rock shaft 43 which is operated by a lever 44.

The boot 26 is provided with a horizontal bearing 45 holding a stationary transverse horizontal shaft 46. This shaft carries a deep grooved pulley 47, rotatable thereon, and this pulley carries a pair of trip elements or pins 48, moving in the path of travel of the crank 30.

The numeral 49 designates an adjustable drive pulley, as a whole. This drive pulley comprises a disk 50, having a tubular hub 51, rigidly secured thereto. This tubular hub has internal splines, to receive the splinder axle sections 14 and a set screw is provided to clamp the hub 51 to the axle section 14 in the selected adjusted position. The hub 51 is exteriorly threaded to engage within a screw-threaded opening 52, formed in a companion opposed disk 53. By turning the disk 53 it is moved toward or from the disk 50 and may be clamped against improper turning movement by set screws 54, having lock nuts 55, as shown. The inner faces of the disks 50 and 53 are frustroconical, providing a deep tapered groove 56, flaring outwardly. The groove 56 receives a longitudinally elastic belt 57, preferably formed of a resilient coil spring, which will yield longitudinally but which is not circumferentially compressible. This coil spring belt 57 also engages within the groove of the pulley 47.

In view of the foregoing description, it will be seen that when the disk 53 is adjusted toward the disk 50, the width of the groove 56 is reduced, which will cause the belt 57 to engage about an increased circumference, thereby causing the belt to rotate the pulley 47 at an increased speed, with respect to a given speed of travel of the tractor.

The operation of the apparatus is as follows:

The tractor is driven down the row in the usual manner, the sword or furrow opener producing the furrow, and the shaft 22 is continuously rotated so that a selected amount of the seed is discharged into the tube 25 and drops down this tube 25 into the boot 26 and is supported by the accumulator valve 28, in proximity to the furrow. A proper amount of seed is therefore accumulated upon the valve 28 at the time that this valve is swung to the open position. Since the valve 28 is inclined downwardly in a rearward direction, when the valve 28 opens, it moves from beneath the seed, which is thereby accurately deposited in a hill, rather than spread over a considerable longitudinal area. The valve 28 is opened intermittently to deposit the seed in the hill, and the timing of the opening of this valve determines the distance between the hills. As the tractor travels down the furrow, the axle section 14 rotates, rotating the pulley 49, and this rotation is transmitted to the pulley 47, through the medium of the longitudinally elastic coil spring belt 57. The action of this coil spring belt is peculiar. The belt 57 first turns the pulley 47 until one of its fingers 48 contacts with the crank 30, but the finger 48 does not at this time swing the crank 30 in opposition to the spring 32, for opening the accumulator valve 28. The pulley 49 continues to turn and since the pulley 47 is now held against turning movement, the coil spring belt 57 is placed under tension, and as soon as this tension is built up so that it exceeds the tension of the spring 32, the pulley 47 will be quickly turned and the accumulator valve 28 quickly opened, the same instantaneously closing when the pin 48 trips from the crank 30. The valve 28 is therefore opened at spaced intervals, but the opening action is rapid, and the closing action is rapid. When it is desired to bring the hills closer together, the disk 53 is adjusted toward the disk 50, increasing the circumference of the groove engaged by the belt 57, and to increase the distance between the hills, the disk 53 is moved from the disk 50, thereby decreasing the circumference of that portion of the groove engaged by the spring belt 57. A further advantage of the coil spring belt 57 is that the accumulator valve 28 is opened and closed at a constant speed, regardless of the adjustment or change of distance between the hills. When the boot 26 and associated elements are raised, for turning around or backing, the coil spring belt 57 contracts and permanently remains within the grooves of the pulleys 47 and 49 but is then sufficiently slack so that it will not drive the pulley 47.

While I have shown my attachment as applied to a tractor, it is to be understood that it may also be applied to a horse drawn wheeled vehicle.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. In a seed planter, a wheeled support, a seed hopper mounted upon the support, a boot and furrow forming means carried by the support, a tube connecting the hopper and the boot, means for feeding the seed from the hopper into the tube, a movable accumulator valve arranged within the boot in proximity to the furrow forming means, yielding means to oppose the opening movement of the accumulator valve, a trip device to move the accumulator valve to open the same, a pulley to operate the trip device, a second pulley mounted upon the support, means to drive the second pulley, and a longitudinally elastic belt engaging the first and second pulleys, the arrangement being such that when the elastic belt is placed under suitable tension it will quickly operate the trip device.

2. In a seed planter, a wheeled support, a seed hopper mounted upon the support, a boot carried by the support and having a furrow forming means associated therewith, means for feeding the seed from the hopper to the boot, a movable accumulator valve arranged within the boot adjacent to the elevation of the furrow-forming means, yielding means to oppose the opening movement of the accumulator valve, a trip device to move the accumulator valve to open the same, a pulley to operate the trip device, a second pulley mounted upon the support, means to drive the second pulley, and a longitudinally elastic belt engaging the first and second pulleys, the arrangement being such that when the elastic belt is stretched and placed under tension to overcome the tension of said yielding means it will quickly operate the trip device.

3. In a seed planter, a wheeled support, a seed hopper mounted upon the support, a boot and furrow forming means carried by the support, a tube connecting the hopper and boot, means to raise and lower the boot and furrow forming means, means for feeding the seed from the hopper into the tube, a pivoted accumulator valve arranged within the boot in proximity to the furrow forming means, yielding means to oppose the opening movement of the accumulator valve, a trip device to move the accumulator valve to open the same, a grooved pulley to operate the trip device, a second grooved pulley mounted upon the support, the distance between the grooved pulleys being reduced when the boot is raised, means to drive the second pulley, and a longitudinally elastic belt engaging the first and second grooved pulleys, the arrangement being such that the elastic belt operates the trip device when the elastic belt is placed under suitable tension, the elastic belt remaining within the grooves of the pulleys when the boot is raised.

4. In a seed planter, a wheeled support, a seed hopper mounted upon the support, a boot carried by the support and receiving seed from the hopper and provided with furrow producing means, an accumulator valve arranged within the boot in proximity to the furrow producing means, a rock shaft mounted upon the boot and carrying the valve, a spring to move the valve to the closed position, a trip crank carried by the rock shaft, a grooved pulley mounted upon the boot and having a trip pin to engage the trip crank, a second grooved pulley mounted upon the support, a longitudinally elastic coil spring belt engaging the grooved pulleys, and means to drive the second pulley, the arrangement being such that when the longitudinally elastic coil spring belt is stretched and placed under tension to overcome the tension of said spring which closes the valve, such belt will quickly operate said trip crank.

5. In a seed planter, a wheeled support, a seed hopper mounted upon the support, a boot carried by the support and receiving the seed from the hopper and having a furrow producing means, a valve arranged within the boot in proximity to the furrow producing means, a rock shaft carried by the boot and having the valve secured thereto, a spring to move the valve to the closed position, a trip crank carried by the rock shaft, a grooved pulley mounted upon the boot and having a trip pin to engage the trip crank, a grooved drive pulley mounted upon the support and including opposed disks, one disk being adjustable toward the other disk, one disk having an inclined face, and a coil spring belt engaging within the grooves of the pulleys, the arrangement being such that when the elastic coil spring belt is stretched and placed under tension to overcome the tension of the spring which closes the valve, said coil spring belt will operate the trip crank.

6. In a seed planter, a support, an axle carrying the support, wheels mounted upon the axle, a hopper mounted upon the support, a boot carried by the support and receiving seed from the hopper and having a sword, a swinging valve arranged within the boot in proximity to the sword, said valve having its free end extending rearwardly with respect to the direction of travel of the planter, a rock shaft carried by the boot and having the valve secured thereto, a spring to move the valve to the closed position, a trip crank carried by the rock shaft, a grooved pulley mounted upon the boot and having a trip pin to engage the trip crank, a grooved drive pulley, and a coil spring belt engaging within the grooves of the pulleys, the arrangement being such that when the elastic belt is stretched and placed under tension to overcome the tension of the spring which closes the valve, said coil spring belt will operate the trip crank.

7. In a seed planter, a tractor having an axle and wheels carried by the axle, a hopper mounted upon a portion of the tractor, a boot carried by the tractor and having a sword, means to raise and lower the boot, a tube connecting the hopper and boot, means to feed seed from the hopper into the tube, a rock shaft carried by the boot, a valve within the boot in proximity to the sword and mounted upon the rock shaft, a trip crank carried by the rock shaft, a grooved pulley mounted upon the boot and having a trip pin to engage the trip crank, a grooved drive pulley mounted upon the axle, said drive pulley including a disk having a hub, a second disk disposed opposite the first disk, means for adjusting the second disk toward or from the first disk and holding the same in the selected adjusted position, said disks having opposed beveled faces forming the side walls of the groove, and a coil spring belt engaging within the grooves of the pulleys, and yielding means to close the valve.

8. A seed planter attachment for a tractor having an axle, a boot to receive seed from a hopper carried by the tractor and having furrow forming means associated therewith, a pivoted valve arranged within the boot adjacent to the elevation of the furrow forming means, yielding means to move the valve to the closed position, trip means to open the valve, a grooved pulley mounted upon the boot to operate the trip means, a grooved pulley mounted upon the axle of the tractor, and a coil spring belt engaging the grooved pulleys, the arrangement being such that when the coil spring belt is stretched and placed under tension to overcome the tension of said yielding means it will quickly operate said trip means.

9. A seed planter attachment for a tractor having a splined axle, a boot to receive seed from a hopper carried by the tractor, said boot having furrow forming means associated therewith, a movable valve within the boot in proximity to the elevation of the furrow forming means, yielding means to move the valve to the closed position, trip means to open the valve, a drive grooved pulley including a disk and a splined hub to be mounted upon the splined axle, a companion disk, means to vary the distance between the disks, at least one disk having an inclined face constituting the side of the groove, and a coil spring belt engaging within the grooves of the pulleys, the arrangement being such that when the coil spring belt is stretched and placed under tension to overcome the tension of the yielding means, such belt will quickly operate the trip means.

WILLIAM A. DENNIS.